J. B. EDDY.
Carpet-Stretcher.

No. 224,887. Patented Feb. 24, 1880.

WITNESSES:
Francis McArdle
C. Sedgwick

INVENTOR:
J. B. Eddy
BY Munn & Co
ATTORNEYS.

UNITED STATES PATENT OFFICE.

JOHN B. EDDY, OF STEVENS POINT, WISCONSIN.

CARPET-STRETCHER.

SPECIFICATION forming part of Letters Patent No. 224,887, dated February 24, 1880.

Application filed July 21, 1879.

*To all whom it may concern:*

Be it known that I, JOHN B. EDDY, of Stevens Point, in the county of Portage and State of Wisconsin, have invented a new and Improved Carpet-Stretcher, of which the following is a specification.

The object of my invention is to provide a simple and economical device for stretching carpets on the floor.

It consists of a T-head, with claws for taking hold of the carpet, attached to a ratchet-bar spliced to another bar carrying a lever, with which the first bar is moved out from the other, and a pawl or dog which engages the ratchet and retains the bar in the position into which it is moved by the lever.

Figure 1:
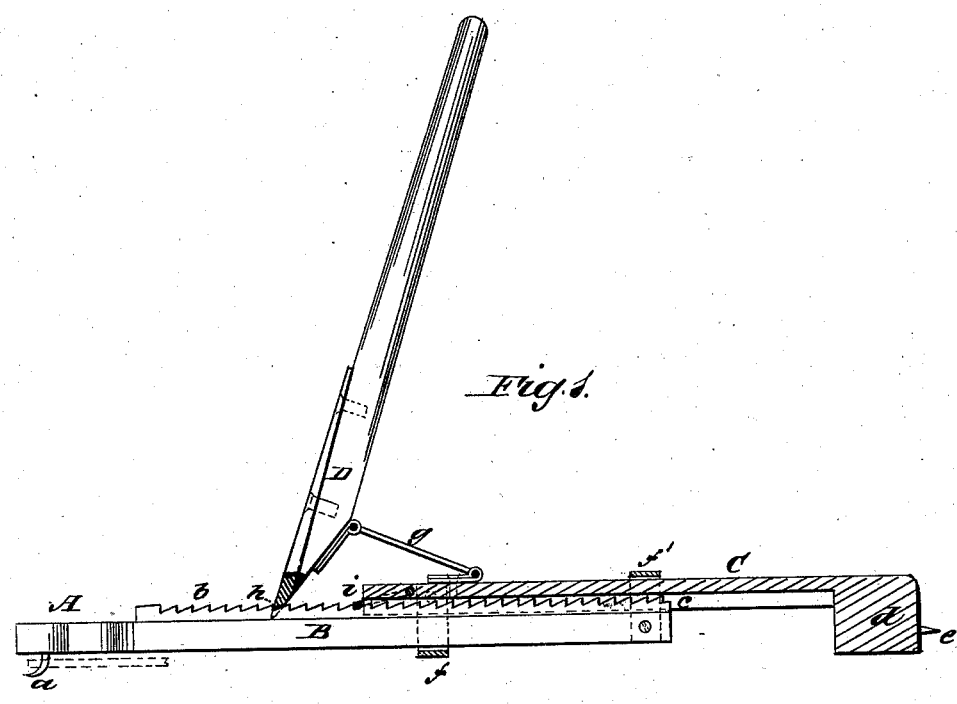
Figure 2:
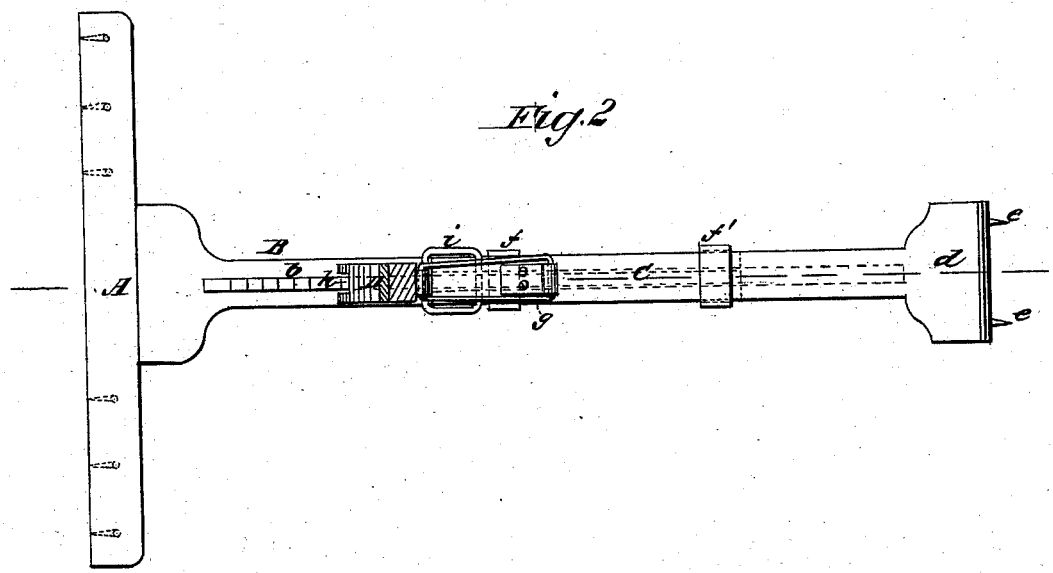

In the accompanying drawings, Figure 1 is a sectional side elevation of my improvement, and Fig. 2 is a top view or plan of the stretcher with the lever cut off horizontally.

Similar letters of reference indicate corresponding parts.

Referring to the drawings, A is the T-head, provided with claws $a$ underneath for taking hold of the carpet. From this head, midway of its length, extends at right angles a bar, B, having on its upper side a ratchet, $b$.

C is another bar, having on its under side a longitudinal groove, $c$, extending to a foot-piece, $d$, from the outer end, whereof project spikes $e$. Bar C is laid on top of bar B, the ratchet entering the groove $c$, and the two are held in connection by bands $f f'$, the first passed under bar B, and with its end attached to bar C near its end, while the latter is connected by its ends with bar B, the two being adjusted so that they can slide freely back and forth.

On top of bar C is pivoted a link, $g$, to which, in turn, is pivoted a lever, D, having a square notch, $h$, in its lower end. The length of the link is such that the lever swings beyond the end of the bar and reaches down so that the ratchet enters notch $h$ and engages the lever. On the same end of the lever is pivoted a pawl or dog, $i$, which is adapted to swing over the end of the bar and engage the ratchet to prevent the lower bar from slipping back after being moved out by the lever.

The device is used as follows: It is laid on the carpet on the floor with the head A near the free edge of the carpet and the claws $a$ inserted in the same, as shown in Fig. 1. The foot $d$ (the two bars being pushed together so that the foot $d$ abuts against the end of B) bears against the end of a bar which extends to the base-board on the opposite side of the room from the head A. The lever is now adjusted over the ratchet, and its end engages the teeth, and by bearing upon it the bar B is forced out, and thus stretches the carpet by pushing it ahead, and as the bar B moves out the pawl drops behind the teeth of the ratchet and holds it in the position to which it is moved as long as may be necessary and at any desired point until the carpet is secured.

This is a very simple arrangement for the purpose, and it can be used by one man alone, as when the carpet is stretched the proper distance the pawl holds it there while the edge is being tacked down.

Having thus described my invention, I claim as new, and desire to secure by Letters Patent—

The combination of the T-head A, having claws $a$, the bar B, having ratchet $b$, the bar C, provided with long groove $c$, foot-piece $d$, and spikes $e$, the bands $f f'$, the pivoted link $g$, the lever D, having square notch $h$, and the pawl $i$, as and for the purpose specified.

JOHN BUSHNELL EDDY.

Witnesses:
M. DAVENPORT,
THOMAS MCGINNIS.